Aug. 4, 1936.   K. R. LUNG   2,049,655
WINDMILL
Filed Jan. 11, 1936
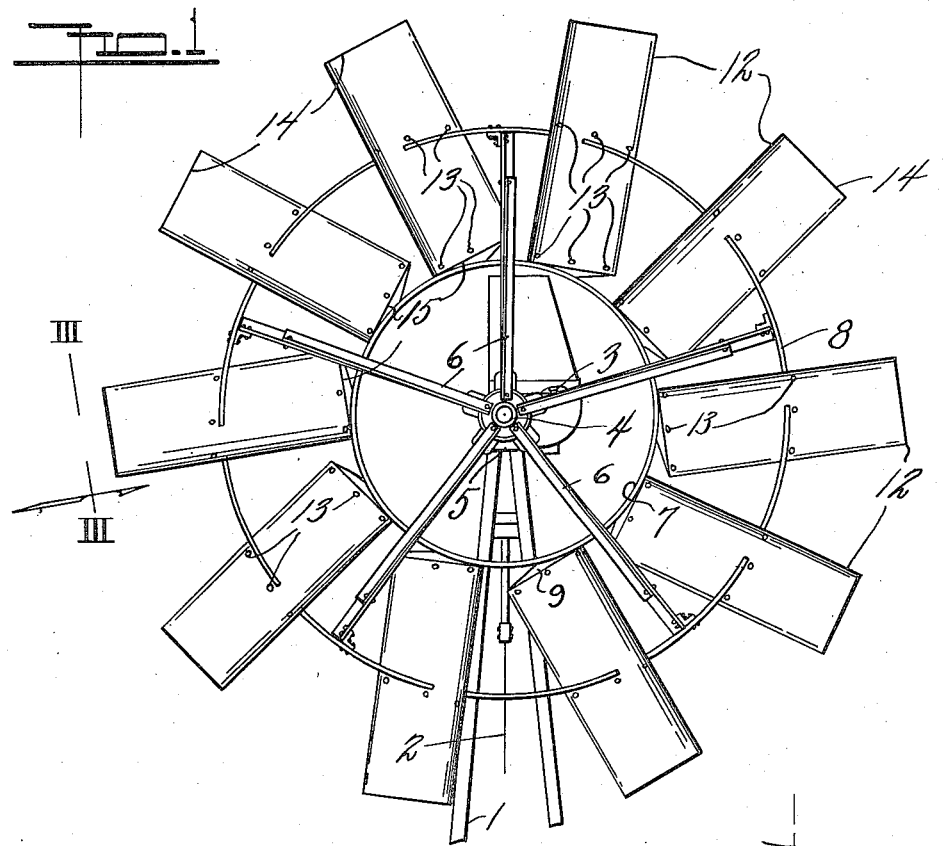
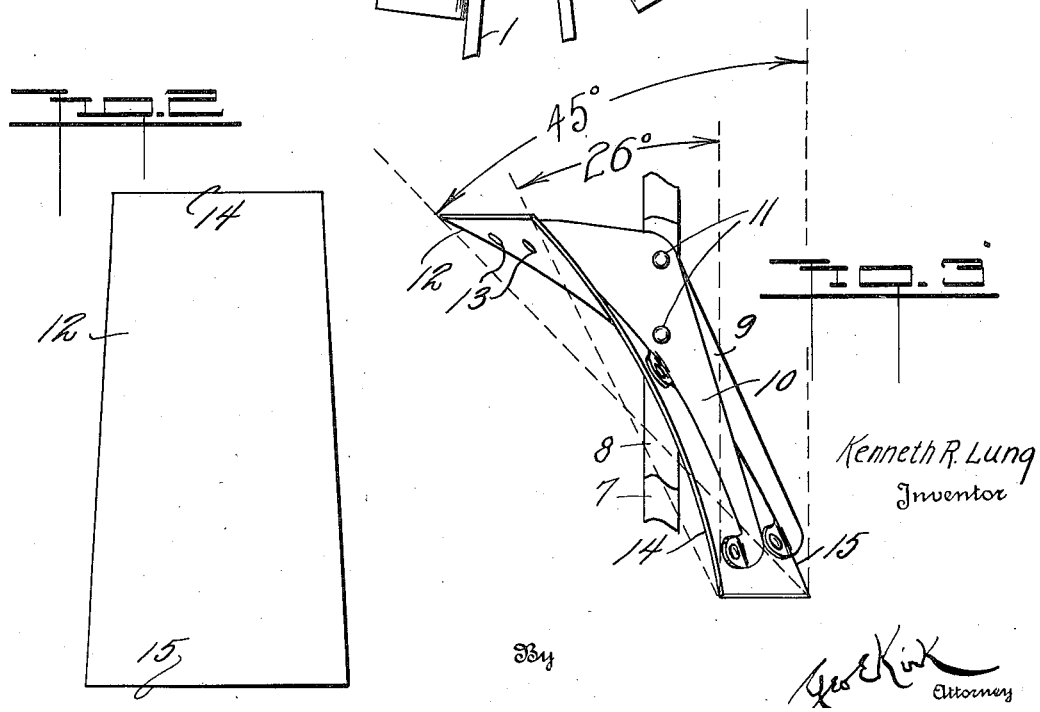
Kenneth R. Lung
Inventor
By Geo E Kirk
Attorney Patented Aug. 4, 1936

2,049,655

UNITED STATES PATENT OFFICE 2,049,655

WINDMILL

Kenneth R. Lung, Kendallville, Ind., assignor to Flint & Walling Manufacturing Company, Kendallville, Ind., a corporation of Indiana Application January 11, 1936, Serial No. 58,722

8 Claims. (Cl. 170—79)

This invention relates to wind-receiving wings or blades for windmills.

This invention has utility when incorporated in wind wheels and wind wheel blades.

Referring to the drawing:

Fig. 1 is a view looking directly into the wind-receiving side of a wind wheel of a windmill hereunder as a power source;

Fig. 2 is a view of a blade or wing blank; and—

Fig. 3 is a view from the line III—III, Fig. 1.

Tower 1 is shown with reciprocating rod 2 connected through gearing 3 with shaft 4 having bearing 5 in the tower 1. This shaft 4 is provided with radiating arms 6 connected by rings 7, 8. There is thus provided frame for mounting brackets 9, 10. The brackets 9, 10, are fixed by rivets 11 with the respective rings 7, 8. Blades or wings 12 are anchored with these brackets 9, 10, by rivets 13.

These wings or blades 12 are in annular series with outer narrower or tip portion 14 and inner wider portion or root 15. The blades are dished with pitch of less advance for the edges at the tips 14 than adjacent the inner edges or roots 15. This dishing or curvature as pitched is such that in projection in the direction axially of the shaft 4, the blade from the trapezoidal blank approximates parallelogram form. This means that the greater pitch of the longer lineal arc 15 is foreshortened; that its angle is for greater air response in wheel spinning as to a current or stream of air axially of the wheel than the less foreshortened, less pitch or shorter lineal curve of the arc edge 14. The blade 12 tapers between the root and tip in blank but not as viewed from axially of the wheel. For counter-clockwise rotation, the leading edge of the blades 12 (Fig. 1) are approximately radial.

In the mill operation, the outer tip portion 14, being at greater radial distance from the shaft 4, has a greater lineal speed. The less pitch for the portion 14 means that it has less instantaneous response to or depth into the air stream than the less lineal travel distance inner portion or root edge 15. In practice, this form of wing or blade is found to contribute materially to the efficiency of the wind wheel. In fact, with the same torque a speed increase of thirty per cent has been attained.

For say an eight foot mill for the diameter from tip to tip of the blades and with the blades of thirty inch radial extent, there is a reduction in actual, not projected, blade width of approximately thirty-nine per cent at the tip for the relative proportion as to the root width of one hundred per cent for the heretofore generally accepted practice of radiating blades which are wider at the tip than at the root. From the reverse viewpoint, taking the tip of such type of blade as one hundred per cent, the root of the blade herein is seventy-eight per cent greater than the root of such. In an instance found of value hereunder, the edge 15 has its pitch advance approximately 45°, while the edge 14 has its pitch advance approximately 26° in the extent of the blade wherein the length of the tip 14 may be thirteen inches and the length of the root 15 may be sixteen inches.

There is herein produced not only a mill of increased efficiency, which means that under lighter breeze it will produce power efficiently, but that such is accomplished with a relatively reduced expense in structure and material.

The parallelogram in practice may be close to rectangular although the tip may be slightly in advance as to the projection axially of the wheel. The projection in the plane of the wheel is close to twice at the root over that at the tip. This means that the root is of a deeper curvature and more inclined. A slant from the radial line permits the same dies to punch the holes in the blades in wheels of different diameters.

What is claimed and it is desired to secure by Letters Patent is:

1. A windmill wheel comprising a hub, a ring spaced from and concentric with the hub, radially extending sheet metal blades anchored with the ring and spaced from the hub, said blades being in annular series, respectively of greater width inwardly than outwardly with straight line contour between the ends thereof, and of approximately constant projected width axially of the wheel.

2. A windmill wheel comprising an endless annular series of blades pitched as to the plane perpendicular to the axis of the wheel at the inner terminus approximately forty-five degrees and at the outer terminus approximately twenty-six degrees.

3. A windmill wheel comprising an endless annular series of curved blades, each having one radially extending edge and an approximately parallel opposing edge as projected axially of said wheel, said blades having greater chord distance between said edges at the lesser radius portions thereof.

4. A windmill wheel comprising an endless annular series of blades, each blade having one edge approximately in the radius of the wheel and the blade extending laterally from such radius and having approximately parallel thereto an opposite outwardly extending edge.

5. A windmill wheel sheet metal blade of transverse curve in its radial extent and of greater pitch advance inward so as to approximate a parallelogram projection axially.

6. A windmill wheel comprising radially extending trapezoidal sheet metal blades of inwardly greater projected width and outwardly less projected width parallel to the axis of the wheel than blades widening outwardly.

7. A windmill wheel comprising radially extending blades of approximately rectangular parallelogram projection axially from the wheel, said blades having transverse depth between the outwardly extending parallel edges, which depth decreases outwardly.

8. A windmill wheel comprising radially extending sheet metal blades of greater lineal transverse extent inward and less pitch advance outward.

KENNETH R. LUNG.